L. L. RUEBUSH.
TRASH AND SOD CHOPPER OR CUTTER.
APPLICATION FILED AUG. 18, 1919.
1,341,825.   Patented June 1, 1920.
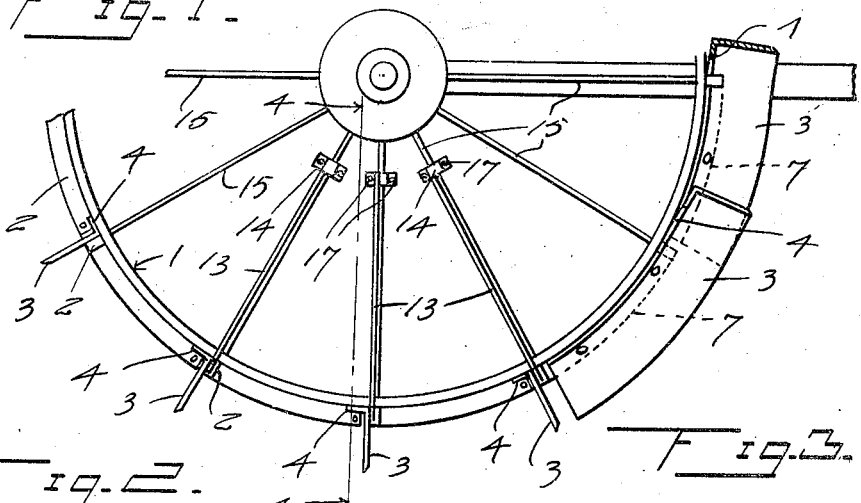
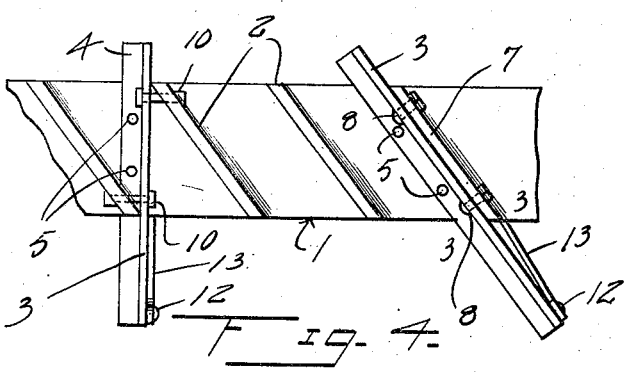
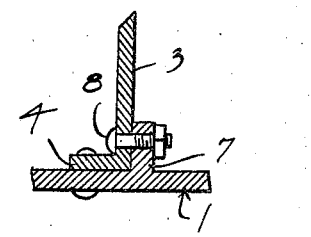
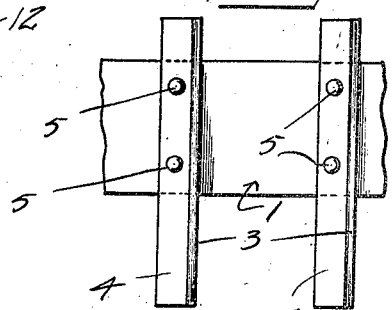
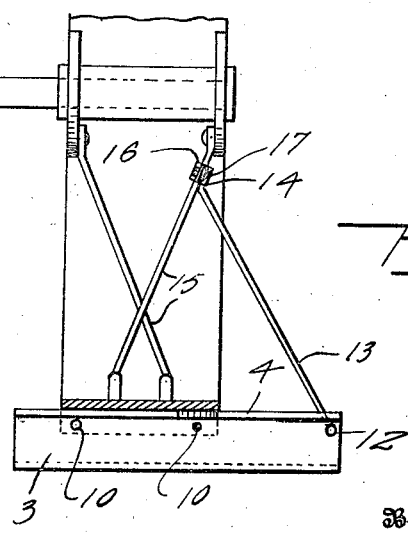
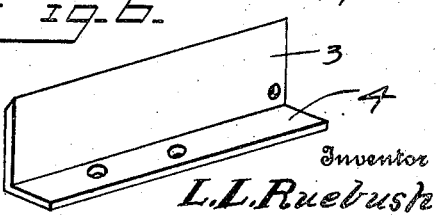
Inventor
L. L. Ruebush
By Watson E. Coleman
Attorney

UNITED STATES PATENT OFFICE.

LEE L. RUEBUSH, OF SCIOTA, ILLINOIS.

TRASH AND SOD CHOPPER OR CUTTER.

1,341,825.  Specification of Letters Patent.  Patented June 1, 1920.

Application filed August 18, 1919. Serial No. 318,223.

*To all whom it may concern:*

Be it known that I, LEE L. RUEBUSH, a citizen of the United States, residing at Sciota, in the county of McDonough and State of Illinois, have invented certain new and useful Improvements in Trash and Sod Choppers or Cutters, of which the following is a specification, reference being had to the accompanying drawings.

This invention relates to an improved trash and sod cutter or chopper, and it consists of a plurality of blades or knives which are detachably carried by a tractor wheel, so that as the tractor wheel rotates as the tractor plow travels forwardly, the blades will impart cutting actions on the sod or trash.

The invention aims to provide a plurality of cutting knives or blades detachably fastened to the perimeter of the tractor wheel, so that the extreme weight of the tractor will send the blades into the ground or sod the full length, thereby cutting the sod crosswise in strips.

A further object of the invention consists in attaching the plurality of cutting blades or knives to the tractor wheels of a tractor plow, so that the plows may cut the sod in directions at right angles to the cuts made by the knives or blades, whereby the sod may be cut in squares. It is the aim to employ the cutting knives in connection with an apparatus which employs stubble mold-board plows, so that the sod may be turned over, as it is cut.

Since the sod is cut in both directions, one cut at right angles to the other, and turned over by the stubble mold-board plows, the sod is in shape for planting, thereby saving considerable labor and time.

A further object of the invention resides in the provision of such cutting blades or knives, as to increase the traction of the tractor, thereby saving fuel. It is obvious that these cutting knives or blades may be used on tractor wheels or the like, or on caterpillar type of traction means.

The invention further aims to provide cutting blades or knives, which may be secured to the perimeter of the tractor wheel, either at right angles to the perimeter and radially thereof, or obliquely inclined and radially, so that the sod may be either cut in squares or otherwise cut, so as to provide sod pieces which have parallel oblique side portions.

A further object of the invention is to either attach the knives or blades to the tractor wheel lugs or ribs, either obliquely disposed correspondingly to certain of the ribs or lugs, or crosswise of the perimeter, and secured to two adjacent ribs or lugs, by means of bolts or other fastening means, so as to reinforce the knives or blades.

The invention further aims to provide blades or knives having right angle flanges, to engage the perimeter of the wheel, so as to reinforce the blades or knives.

While the design and construction at present set forth and illustrated is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view of a portion of a tractor plow, showing the tractor wheels thereof, illustrating the improved knives or blades secured to the perimeter of the wheels, illustrating certain of the blades or knives secured obliquely and others secured at right angles to the perimeter and fastened to the ribs or lugs of the wheel.

Fig. 2 is a plan view of Fig. 1, showing the attachment of blades, one secured at right angles to the perimeter and the other secured obliquely.

Fig. 3 is a sectional view transversely of the obliquely disposed blade in Fig. 2.

Fig. 4 is a sectional view on line 4—4 of Fig. 1.

Fig. 5 is a plan view of a portion of the perimeter of a wheel showing blades or cutters secured to a plain perimeter.

Fig. 6 is an enlarged detail perspective view of one of the cutters or blades.

Referring more especially to the drawings, 1 designates a tractor wheel which may be any suitable construction or configuration, and which has its perimeter provided with a plurality of ribs or lugs 2, though not necessarily, for it is possible to use a tractor wheel which has its perimeter plain, as illustrated in Fig. 5.

As shown in Fig. 1, a plurality of cutting or chopping blades 3 are provided, and these blades are provided with right angle flanges 4, which engage the perimeter of the wheel, thereby reinforcing the same. If necessary, suitable bolts or the like 5 may pass through said flanges and through the perimeter of the wheel, so as to insure a fixed connection between the blades or knives and the perimeter of the wheel.

Certain of the blades or knives in Fig. 1 are arranged obliquely of the perimeter, according to the oblique arrangement of certain of the lugs or ribs 7 of the perimeter, there being bolts or the like 8 passing through the blades and the lugs or ribs, so as to additionally secure the knives or blades in position. These blades project beyond the outer side edge of the perimeter of the wheel a greater distance than their opposite ends, so that the blades may act to cut stalks, as readily as cutting the sod or trash. The cutting blades or knives will more readily act as stalk cutters, when they are disposed obliquely corresponding to the ribs or lugs of the perimeter of the wheel, since the knives or blades will impart shearing cuts, as the wheel rotates. However, the blades that are disposed crosswise or at right angles to the perimeter of the wheel will also act as stalk cutters, but not effectively as when they are disposed obliquely.

Also, in Fig. 1 it is to be noted that certain of the blades or knives are arranged crosswise or at right angles to the perimeter of the wheel, and are secured to the opposite ends of certain adjacent ribs or lugs of the perimeter of the wheel, in order to reinforce the knives or blades. It is obvious that all the blades may be arranged at right angles to the perimeter or obliquely arranged. Suitable bolts 10 are employed to secure certain of the blades to the opposite ends of adjacent ribs or lugs, on the perimeter of the wheel.

Referring to Fig. 5, a plain perimeter tractor wheel is illustrated, and to which a plurality of blades or cutting knives is attached. In this instance, the blades are arranged at right angles to the perimeter of the wheel, and in this instance the securing means of the flanges of the knives or blades pass through said flanges, and through the perimeter of the wheel, thereby rigidly fastening the blades or knives on the perimeter. It is obvious that the blades or knives in Fig. 4 may be bolted or secured to the perimeter obliquely, and may be used as effectively as the blades which are secured at right angles or crosswise of the perimeter.

The outer ends of the blades or knives have connected thereto as at 12, by means of bolts, rods 13, which have their other ends terminating in semi-circular portions 14. The rods 13 are inclined toward the hub of the tractor wheel, whereby the semi-circular portions may embrace the spokes 15 of the wheel, adjacent the hub thereof. The semi-circular straps or plates 16 embrace the spokes, and are secured to the semi-circular portions 14 by means of the bolts 17, thereby securely fastening the rods in place, and bracing the cutting knives or blades.

As the tractor plow travels forwardly, the cutting knives or blades will embed into the sod, owing to the extreme weight of the tractor, thereby cutting the sod transversely or obliquely. As previously stated, it is the design of the invention to employ these cutting knives or blades on tractor plows which use stubble mold-board plows, so that as the sod is cut transversely, the plows will cut the sod in the other direction, and tend to turn the sod over, so that when it is gathered, it is in shape for planting.

The invention having been set forth, what is claimed as new and useful is:

1. The combination with a tractor wheel having a plurality of tractor ribs, a plurality of combined tractor and cutting knives or blades conforming to and engaging said tractor ribs and having their ends projecting beyond the opposite edges of said perimeter, braces connected to the outer ends of the knives or blades and having their inner ends connected to the spokes of the wheel adjacent the hub, said blades having right angle flanges, means passing through said flanges and through the perimeter of the wheel to assist in fastening the blades or knives in position, and means passing through the ribs and the blades, thereby additionally securing the blades or knives in place.

2. The combination with a tractor wheel, which includes a broad single perimeter provided with tractor ribs integral therewith, extending across and radially from the outer face of the perimeter; of a plurality of auxiliary tractor elements arranged across the outer face of the perimeter, each of said elements being a right angle or L-shaped in cross section, said elements having certain of their flanges engaging flat against the outer face of the perimeter, certain other of the flanges of said elements extending radially and being adjacent the tractor ribs, means passing through the first flanges of the perimeter to assist in securing said elements to the perimeter, means passing through the second flanges and the ribs to further assist in rigidly reinforcing the elements relatively to the perimeter and the ribs, said elements extending farther laterally from one edge of the perimeter than from the opposite edge and the radial flanges of the lateral extending parts being provided with cutting edges thereby constituting cutting blades.

3. The combination with a tractor wheel which includes a broad single perimeter, and crossing angularly disposed spokes connecting the perimeter and the hub of the wheel, said perimeter being provided with tractor ribs extending diagonally across and radially from the outer face of the perimeter; of a plurality of auxiliary tractor elements arranged diagonally across the outer face of the perimeter, each of said elements being a right angle or L-shaped in cross section thereby conforming to the right angle adjacent where the rib projects from the perimeter, said elements having certain of their flanges engaging flat against the outer face of the perimeter, certain other of the flanges of said elements extending radially and being adjacent and conforming to the tractor ribs, means passing through the first flanges and the perimeter to assist in securing said elements to the perimeter, means passing through the second flanges and the ribs to further assist in rigidly reinforcing the elements relatively to the perimeter and the ribs, said elements extending farther laterally from one side of the perimeter than from the opposite edge, the radial flanges of the lateral extended parts being provided with cutting edges thereby constituting cutting blades, and braces connected to the ends of the laterally extended parts and being inclined substantially correspondingly with the inclination of certain of the spokes toward the hub of the wheel and being connected to the other oppositely inclined spokes, thereby reinforcing said blades.

In testimony whereof I hereunto affix my signature.

LEE L. RUEBUSH.